United States Patent
Chiaburu et al.

(10) Patent No.: US 7,855,562 B2
(45) Date of Patent: Dec. 21, 2010

(54) DUAL SENSOR SYSTEM HAVING FAULT DETECTION CAPABILITY

(75) Inventors: Liviu Chiaburu, Chandler, AZ (US); Marco Fuhrman, Mesa, AZ (US); Thomas D. Ohe, Tempe, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 504 days.

(21) Appl. No.: 11/942,149

(22) Filed: Nov. 19, 2007

(65) Prior Publication Data

US 2009/0128160 A1    May 21, 2009

(51) Int. Cl.
    *G01R 31/02* (2006.01)
    *G01R 31/00* (2006.01)
(52) U.S. Cl. .................................... 324/537; 702/58
(58) Field of Classification Search ............... 324/537; 702/58
    See application file for complete search history.

(56) References Cited

U.S. PATENT DOCUMENTS

| | | | |
|---|---|---|---|
| 6,016,465 A | 1/2000 | Kelly | |
| 6,704,682 B2 | 3/2004 | Summers et al. | |
| 6,831,466 B2 | 12/2004 | Down et al. | |
| 7,136,729 B2 * | 11/2006 | Salman et al. | 701/29 |
| 7,200,469 B2 | 4/2007 | Katrak et al. | |

* cited by examiner

*Primary Examiner*—Amy He
(74) *Attorney, Agent, or Firm*—Meschkow & Gresham, P.L.C.

(57) ABSTRACT

A sensor system (20) includes transducers (32, 34) each yielding an analog signal (37, 39) representing a parameter independently sensed by each of the transducers (32, 34). The signals (37, 39) are summed and the resulting transducer signal (46) is converted to a digital transducer signal (26) by a high resolution analog-to-digital converter (ADC) (48). Concurrently, one of the signals (37, 39) is subtracted from the other. The resulting difference signal (56) is converted to a digital difference signal (60) by a low resolution ADC (58). When the digital difference signal (60) is within a threshold window (78), a fault signal (28) indicates a normal condition (80) of the transducers (32, 34). When the signal (60) falls outside of the threshold window (78), a fault signal (28) indicates a fault condition (82) of the transducers. The transducer and fault signals (26, 28) are concurrently output from the sensor system (20).

12 Claims, 3 Drawing Sheets

DUAL SENSOR SYSTEM HAVING FAULT DETECTION CAPABILITY

TECHNICAL FIELD OF THE INVENTION

The present invention relates generally to sensor systems. More specifically, the present invention relates to fault detection in sensor systems.

BACKGROUND OF THE INVENTION

Many systems utilize sensors to monitor and/or control the operation of the systems. Applications in which sensors are utilized include, for example, automobiles, machines, aerospace, medicine, industry, robotics, and the like. The sensors can be used to measure one or more system variables such as pressure, temperature, speed, acceleration, motion, proximity, and so forth. Sensor outputs may then be used as feedback in a closed-loop operation to ensure that the system is being operated at the desired conditions, that safety bounds are being observed, and that system performance is being optimized. Technological advances have enabled many more sensors to be manufactured on a microscopic scale using microelectromechanical systems (MEMS) technology. MEMS technology combines microelectronics with miniaturized mechanical systems such as valves, gears, and any other component or components on a semiconductor chip using nanotechnology. Such microsensors can operate at significantly higher speeds and with greater sensitivity as compared to macroscopic designs.

Although sensors are typically designed to be robust, sensor failure can still occur. The possibility of sensor failure is typically addressed through the use of redundant sensors. By duplicating sensor components, if a fault arises in one of the sensors, its presence is indicated by virtue of the two sensor signals being dissimilar. For example, in one prior art design, a dual sensor system utilizes at least two discrete sensor circuits, each of the sensor circuits including a sensor, an analog-to-digital converter (ADC), a processor, an output circuit and an output switch. In such a design, only one sensor generates an output signal, whereas the other sensor is used for comparison to detect faults. The dissimilarity, or mismatch, between the two sensors can be detected in real time. The implementation of such a dual sensor system is undesirably complex and large, especially when implemented within the area constraints of MEMS architecture. A complex and large structure drives up costs and/or reduces yield.

Another dual sensor design has one signal conditioning and ADC path that is used sequentially with each of the two sensors in order to generate a signal and measure the dissimilarity. The dissimilarity between the two sensors is detected with some delay. Consequently, this dual sensor design cannot detect faults in real time. Moreover, in many designs, resolution of the sensor is sacrificed in order to meet size, cost, and complexity constraints. Thus, what is needed is a dual sensor system that enables detection of sensor faults in real time and provides a high resolution output signal in a minimally sized, low cost, and readily implemented package.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION

Figure 1:
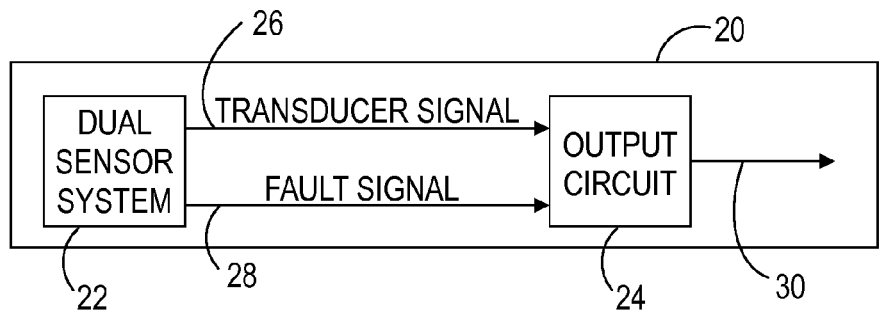
FIG. 1 shows a block diagram of an apparatus that includes a dual sensor system of the present invention.

FIG. 1 shows a block diagram of a device 20 that includes a dual sensor system 22 of the present invention. Device 20 represents numerous systems and devices in which a sensor is incorporated for monitoring and/or controlling the operation of device 20. For example, device 20 including dual sensor system 22 can be realized within an automobile safety application, a machine, aerospace system, a medical device, a robotic device, and the like. Dual sensor system 22 can be used to measure a particular parameter for device 20 such as pressure, temperature, speed, acceleration, motion, proximity, and so forth.

For purposes of the following discussion, dual sensor system 22 is in communication with a downstream component, for example, an output circuit 24 of device 20. Output circuit 24 receives a digital transducer output signal 26 from dual sensor system 22. In addition, output circuit 24 receives a signal, referred to herein as a fault signal 28, indicative of a condition of the dual transducers (discussed below) of dual sensor system 22. Output circuit 24 evaluates fault signal 28 to determine whether a fault is indicated in dual sensor system 24 and performs pre-defined tasks in response to fault signal 28. For example, if output circuit 24 determines that fault signal 28 indicates a normal condition of dual sensor system 24, output circuit 24 receives digital transducer output signal 26 and acts accordingly. When a normal condition is indicated, such action may be to activate a downstream system in response to digital transducer output signal 26, store transducer output signal 26 as a valid measurement, and so forth. Alternatively, if output circuit 24 determines that fault signal 28 indicates a fault condition, output circuit 24 may prevent activation of a downstream system, discard or ignore digital transducer output signal 26, and the like.

Device 20 is shown with only dual sensor system 22 and output circuit 24 for simplicity of illustration. Those skilled in the art will appreciate that device 20 includes many more components and functions, as represented by an output arrow 30, corresponding to its actual function.

Figure 2:
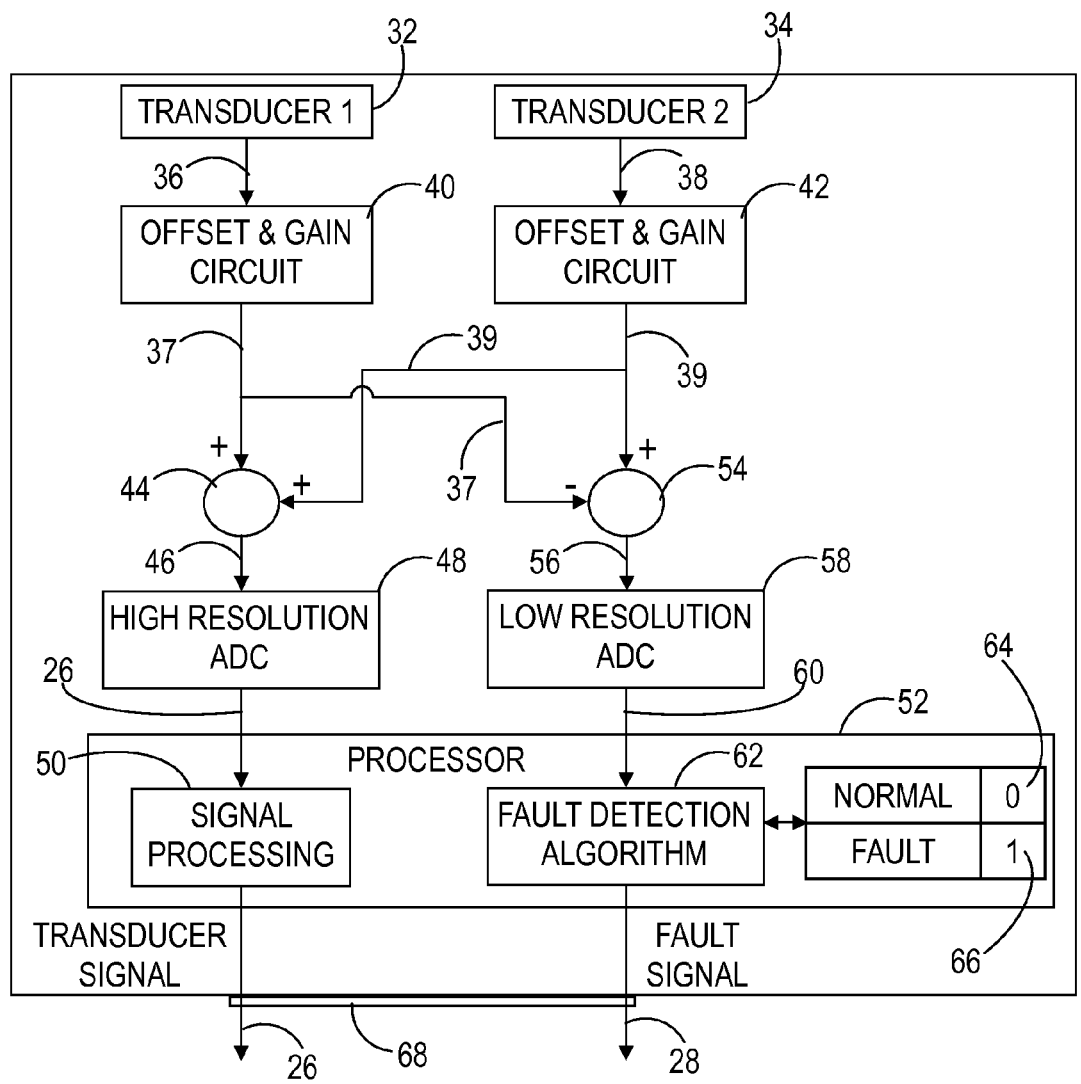
FIG. 2 shows a block diagram of the dual sensor system.

FIG. 2 shows a block diagram of dual sensor system 22. Dual sensor system 22 includes a transducer 32 and a transducer 34. Transducer 32 produces a transducer signal 36. Similarly, transducer 34 produces a transducer signal 38. Signals 36 and 38 represent a parameter being independently sensed by both of transducers 32 and 34. In one embodiment, dual sensor system 22 with transducers 32 and 34 may be implemented within a microelectromechanical systems (MEMS) architecture. Thus, real time fault detection and high resolution measurements can be achieved on a relatively low complexity and low production cost MEMS architecture. Although one embodiment of dual sensor system 22 is implemented as a MEMS structure, it should be appreciated by those skilled in the art that dual sensor system 22 may instead be implemented using other microscopic and macroscopic designs where real time fault detection and high resolution measurements are required.

In one exemplary scenario, transducers 32 and 34 may be pressure transducers for measuring a pressure parameter.

Each of transducers 32 and 34 thus independently generate respective signals 36 and 38 related to the pressure imposed on dual sensor system 22. In one embodiment, transducers 32 and 34 are largely identical transducers, for example, they are of the same make and type thus yielding similar signals 36 and 38 in response to the same stimulus. Although dual sensor system 22 will be discussed in terms of sensing pressure, it should be appreciated by those skilled in the art that transducers 32 and 34 need not be pressure transducers, but may alternatively be another device that converts one form of energy to another, such as a temperature sensor, a velocity sensor, an acceleration sensor, a motion sensor, a proximity sensor, and so forth.

Transducer 32 is in communication with an offset and gain circuit 40 and transducer 34 is in communication with an offset and gain circuit 42. Offset and gain circuits 40 and 42 function respectively to condition transducer signals 36 and 38. Such conditioning can entail conversion of signals 36 and 38 to analog voltage output signals 37 and 39, respectively. In addition, conditioning can include the adjustment of coarse offset, i.e., the difference between analog signals 37 and 39 and a reference input, and adjustment of coarse gain, i.e., increase or decrease the voltage of respective analog signals 37 and 39, through trim registers.

A summing circuit 44 is in communication with each of transducers 32 and 34 via respective offset and gain circuits 40 and 42. Summing circuit 44 adds analog signal 37, previously conditioned by offset and gain circuit 40, and analog signal 39, previously conditioned by offset and gain circuit 42, to produce an analog transducer signal 46. Transducer signal 46 is a combined signal that effectively results in a signal having a high signal to noise ratio. Summing circuit 44 may be implemented in hardware as part of, for example, the front end of an analog-to-digital converter (ADC), discussed below. In general, the incoming voltage is converted into a charge for each of signals 37 and 39. These two charges can then be summed onto an integration capacitor of the ADC to yield transducer signal 46.

Summing circuit 44 is in communication with an analog-to-digital converter (ADC) 48, such as a sigma delta converter. Transducer signal 46 is input into ADC 48 for conversion to the digital domain to produce transducer output signal 26. That is, the continuous analog transducer signal 46 is converted by ADC 48 to discrete digital numbers, i.e., digital transducer output signal 26. ADC 48 outputs digital transducer signal 26 to a signal processing portion 50 of a processor 52. Signal processing portion 50 may be software, hardware, or a combination of hardware and software that functions to further process digital transducer signal 26 prior to signal 26 being output from dual sensor system 22. For example, signal processing portion 50 may function to compensate offset, gain, and linearity over temperature. Signal processing could also entail filtering and/or data formatting.

A subtraction circuit 54 is also in communication with each of transducers 32 and 34 via their respective offset and gain circuits 40 and 42. Subtraction circuit 54 determines a difference between analog signal 37, previously conditioned by offset and gain circuit 40, and analog signal 39, previously conditioned by offset and gain circuit 42, to produce a difference signal 56. For example, difference signal 56 may be determined by subtracting analog signal 37 from analog signal 39. Difference signal 56 provides a measure of the difference between analog signals 37 and 39. This difference can be used to ascertain a fault condition in at least one of the two transducers 32 and 34. Like summing circuit 44, subtraction circuit 54 may be implemented in hardware as part of, for example, the front end of a sigma delta analog-to-digital converter (ADC), discussed below. In general, the incoming voltage is converted into a charge for each of signals 37 and 39. These two charges can then be subtracted onto an integration capacitor of the ADC to yield difference signal 56.

Subtraction circuit 54 is in communication with an ADC 58, such as a sigma delta converter, and difference signal 56 is input into ADC 58 for conversion to the digital domain to produce a digital difference signal 60 indicative of a condition of transducers 40 and 42. Again, the continuous analog difference signal 56 is converted by ADC 58 to discrete digital numbers, i.e., difference signal 60.

The resolution of an analog-to-digital converter indicates the number of discrete values it can produce over a range of analog values. The values are typically stored in binary form, so the resolution is typically expressed in bits. Consequently, the number of discrete values available, or "levels," is usually a power of two. For instance, an ADC with a resolution of 10 bits can encode an analog input to one in 1024 different levels, since $2^{10}=1024$. Whereas, an ADC with a resolution of 14 bits can encode an analog input to one in 16384 different levels, since $2^{14}=16384$. In one embodiment, the resolution of ADC 48 is greater than that of ADC 58. For example, the resolution of ADC 48 may be fourteen bits and the resolution of ADC 58 may be ten bits. Such a configuration yields high resolution measurements and, effectively, an increase in the signal to noise ratio of transducer signal 26 in the high resolution ADC 48. At the same time, the simpler ADC 58 can produce difference signal 60 at a resolution sufficient for determining a fault condition of transducers 32 and 34.

The simplicity of ADC 58 results in the utilization of less die space and the consumption of less current. For example, high resolution ADC 48 may be as much as thirty times larger in area than low resolution ADC 58, so significant savings in area can be achieved as opposed to using two high resolution ADCs. In addition, the lower current consumption makes it suitable for power constrained applications such as in satellite communications systems.

ADC 58 outputs digital difference signal 60 to a fault detection algorithm 62 executed by processor 52. Fault detection algorithm 62 may be software, hardware, or a combination of hardware and software that functions to compare digital difference signal 60 against a threshold value or threshold window to determine whether the operating condition of transducers 32 and 34 is either a normal condition or a fault condition. Through the execution of fault detection algorithm 62 in the digital domain, more accurate measurements can be obtained and more sophisticated algorithms can be applied relative to fault detection in an analog domain.

Since fault detection algorithm 62 is evaluating a difference signal 60, it may not be readily apparent which of transducers 32 and 34 is faulting. Such a distinction may not be necessary because summing circuit 44 utilizes both analog signal 37 from transducer 32 and analog signal 39 from transducer 34 to produce transducer signal 46. Because measurements from both transducers 32 and 34 are utilized, it's less relevant in this configuration to determine which of transducers 32 and 34 is faulting. Rather, it is of greater criticality to accurately distinguish a fault condition from a normal operating condition in real time while concurrently producing a high resolution transducer signal 26.

In one embodiment, fault detection algorithm 62 produces a logical output 64 set to "0" when a determination is made from digital difference signal 60 that the operating condition of transducers 32 and 34 falls within a normal range. Fault detection algorithm 62 alternatively outputs a logical output 66 set to "1" when a determination is made from digital difference signal 60 that the condition of transducers 32 and 34 falls outside of a normal range, i.e., a fault condition is detected. An output 68 of dual sensor system 22 is in communication with processor 52 and concurrently provides fault signal 28, as one of logical outputs 64 and 66, with transducer signal 26 for receipt at output circuit 24 (FIG. 1).

Figure 3:
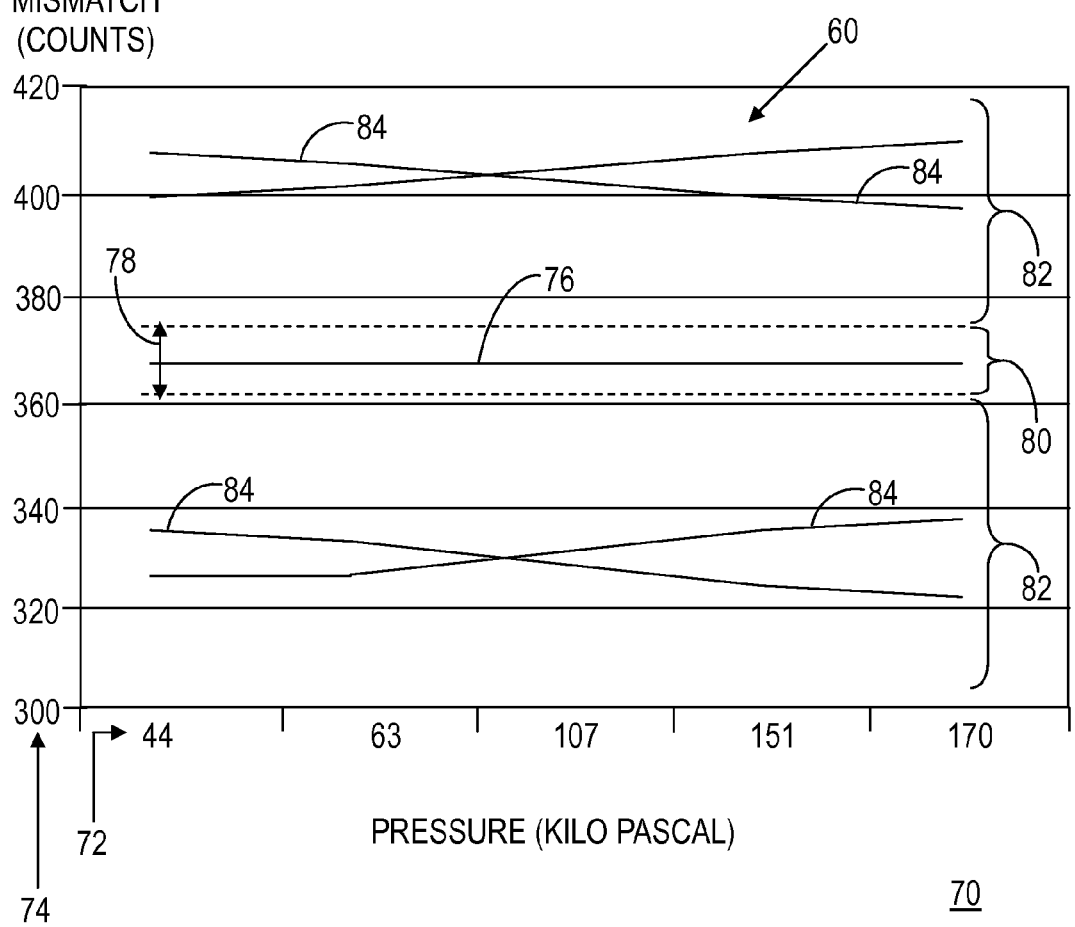
FIG. 3 shows a chart of exemplary difference signals produced by the dual sensor system, each of which indicates a condition of the transducers of the dual sensor system.

FIG. 3 shows a chart 70 of exemplary difference signals 60 produced by dual sensor system 22 (FIG. 2), each of which indicates a condition of transducers 32 and 34 (FIG. 2) of dual sensor system 22. Chart 70 shows a range of pressure values 72 on its x-axis versus transducer mismatch (in counts) 74 on its y-axis. One of difference signals 60 is a normative value, e.g., a normative signal 76. When transducers 32 and 34 are functioning normally, their respective analog signals 37 and 39 (FIG. 2) are largely matched. Accordingly, normative signal 76, arrived at through the subtraction function of subtraction circuit 54 (FIG. 2), is generally constant over range of pressure values 72, and in this exemplary instance at approximately 367 counts. Normative signal 76 also remains constant over multiple intervals of pressure sensing.

Chart 70 further illustrates a threshold window 78 set at +/−N counts around normative signal 76. A normal condition 80 of transducers 32 and 34 is indicated when difference signal 60 falls within threshold window 78. However, a fault condition 82 is flagged when difference signal 60 falls outside of threshold window 78. For purposes of illustration, chart 70 includes multiple instances of difference signals 84 falling outside of threshold window 78. When transducers 32 and 34 are mismatched, the resulting difference signals 84 can be both elevated and reduced relative to normative signal 76. The normative value, i.e., normative signal 76, is represented herein as a fixed value about which threshold window 78 is constructed. It should be understood however, that a normative value may or may not be fixed. That is, the normative value could vary from component-to-component, it could be equation-based, or it could depend on inputs from other sensors (e.g., temperature or voltage).

Fault detection algorithm 62 (FIG. 2) is discussed herein as performing a comparison between difference signal 60 and threshold window 78. However, since the evaluation is being performed in the digital domain, algorithm 62 can be readily expanded to take temperature, supply voltage, and actual sensor readings into account to make fault detection more accurate. In one scenario, a temperature sensor signal used for main signal calibration can also be used to compensate the fault detection. In combination with a voltage sensor and inclusion of transducer output signal 26, additional compensation is possible to make the fault detection more accurate. That is, the slopes shown in difference signals 84 of chart 70 can be compensated by increasing the gain of the difference signal.

Figure 4:
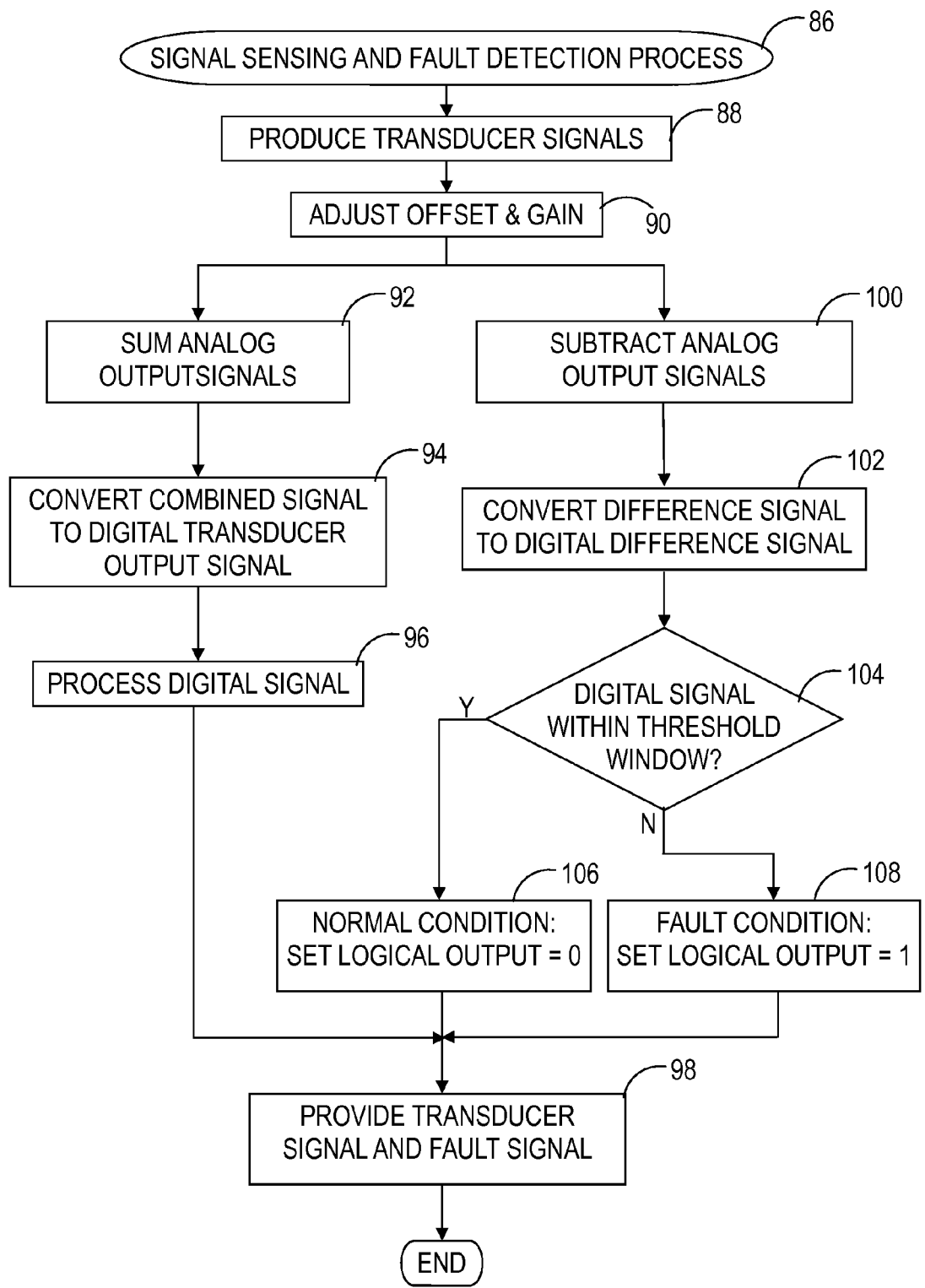
FIG. 4 shows a flowchart of a signal sensing and fault detection process performed by the dual sensor system.

Referring to FIG. 4 in combination with FIG. 2, FIG. 4 shows a flowchart of a signal sensing and fault detection process 86 performed by dual sensor system 22. Signal sensing and fault detection process 86 may be a continuous process for monitoring and/or providing feedback control within device 20 (FIG. 1).

Process 86 begins with a task 88. At task 88, transducer signals 36 and 38 are produced at respective transducers 32 and 34. Next, at a task 90, signals 36 and 38 are converted to analog voltage output signals 37 and 39, and offset and gain of analog signals 37 and 38 may be adjusted at respective offset and gain circuits 40 and 42.

Following task 90, signal sensing and fault detection process 86 branches to perform concurrent operations. One branch of process 86 is executed to obtain the high resolution digital transducer output signal 26. The other branch of process 86 provides the fault detection capability of dual sensor system 20.

In order to obtain transducer output signal 26, a task 92 is performed following task 90. At task 92, analog signals 37 and 39 are combined at summing circuit 44. The combined analog transducer signal 46 results from the summation of analog signals 37 and 39.

Following task 92, a task 94 is performed at high resolution ADC 48. ADC 48 receives analog transducer signal 46 and converts the combined analog transducer signal 46 to digital transducer output signal 26. A task 96 may then be performed at signal processing portion 50 of processor 52 to further process digital transducer signal 26. Following task 96, process 86 continues with a task 98 (discussed below).

In order to determine a condition of transducers 32 and 34 of dual sensor system 22, a task 100 is additionally performed following task 90. At task 100, analog signal 37 is subtracted from analog signal 39 to produce difference signal 56 at subtraction circuit 54. Following task 100, a task 102 is performed at low resolution ADC 58. ADC 58 converts difference signal 56 to digital difference signal 60 indicative of the condition of transducers 32 and 34. Digital difference signal 60 is input into fault detection algorithm 62 of processor 52.

In response to the input of digital difference signal 60, fault detection algorithm 62 performs a comparison of difference signal 60 with threshold window 78 (FIG. 3). A query task 104 is performed in connection with this comparison. At query task 104, fault detection algorithm 62 determines whether digital difference signal 60 falls within threshold window 78. When a determination is made at query task 104 that digital difference signal 60 falls within threshold window 78 (FIG. 3), process 86 continues with a task 106. The condition in which digital difference signal 60 falls within window 78 signifies normal condition 80 (FIG. 3). Thus, logical output 64 of "0" is set at task 106. However, when a determination is made at query task 104 that digital difference signal 60 falls outside of threshold window 78, process 86 continues with a task 108. The condition in which digital difference signal 60 falls outside of window 78 signifies fault condition 82 (FIG. 3). Thus, logical output 66 of "1" is set at task 108. Following either of tasks 106 and 108, process 86 continues with task 98.

At task 98, digital transducer signal 26 and the fault signal 28, of either logical output 64 or logical output 66, are concurrently provided from output 68 to the downstream component, embodied herein as output circuit 24 (FIG. 1). In an alternative embodiment, when fault condition 82 is determined, processor 52 may overwrite digital transducer signal 26 with a series of zeros or some other indicator to ensure that output circuit 24 (FIG. 1) will not inadvertently respond to digital transducer signal 26 when fault condition 82 is detected. Following task 98, the current iteration of signal sensing and fault detection process 86 ends.

An embodiment described herein comprises a dual sensor system having fault detection capability and a method of fault detection in a device that includes the dual sensor system. The dual sensor system includes two transducers, each of which produces an analog signal representing a parameter that is being independently sensed by both of the transducers. The two signals are added and converted by a high resolution ADC. Concurrently, the two signals are subtracted and the resulting difference signal is converted by a low resolution ADC. The summed and digitized signal is provided as a high resolution transducer output signal having increased signal to noise ratio relative to prior art designs. The subtracted and digitized difference signal is provided to detect a fault condition of the transducers. Thus, fault detection can be performed in real time, i.e., concurrent with the measured and combined transducer output signal. The lower resolution ADC achieves savings in die area and it consumes lower current, than a higher resolution ADC making is suitable for power constrained applications. Moreover, the dual sensor system can be readily implemented in a MEMS architecture where miniaturization, high operating speeds, high sensitivity, and real time fault detection are essential.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A sensor system having fault detection capability comprising:
   a first transducer producing a first analog signal;
   a second transducer producing a second analog signal, said first and second analog signals representing a parameter being independently sensed by both of said first and second transducers;
   a subtraction circuit in communication with each of said first and second transducers for determining a difference between said first analog signal and said second analog signal to produce a difference signal;
   a summing circuit in communication with each of said first and second transducers for adding said first analog signal and said second analog signal to produce a transducer output signal;
   a first analog-to-digital converter (ADC) in communication with said subtraction circuit for receiving said difference signal and generating a corresponding digital difference signal indicative of a condition of said first and second transducers;
   a processor in communication with said first ADC for generating a logical output signal in response to said digital difference signal indicative of said condition of said first and second transducers;
   a second ADC in communication with said summing circuit, said second ADC receiving said transducer output signal and generating a digital transducer output signal indicative of said sensed parameter; and
   an output in communication with each of said processor and said second ADC for concurrent provision of said logical output signal with said transducer output signal.

2. A sensor system as claimed in claim 1 wherein said processor compares said digital difference signal against a threshold value to determine whether said condition of said first and second transducers is one of a normal condition and a fault condition.

3. A sensor system as claimed in claim 2 wherein said processor outputs a first logical output signal in response to determination of said normal condition and said processor outputs a second logical output signal in response to determination of said fault condition.

4. A sensor system as claimed in claim 2 wherein said threshold value is a threshold window around a normative value for said difference signal, and said processor compares said difference signal against said threshold window and flags said difference signal as said fault condition when said difference signal falls outside of said threshold window.

5. A sensor system as claimed in claim 1 wherein said first ADC exhibits a first resolution, said second ADC exhibits a second resolution, said second resolution being greater than said first resolution.

6. A sensor system as claimed in claim 1 wherein said first and second transducers are microelectromechanical sensors.

7. A method of fault detection in a device that includes a dual sensor system having first and second transducers that independently sense a parameter, said method comprising:
   producing a first analog signal at said first transducer;
   producing a second analog signal at said second transducer, said first and second analog signals representing said sensed parameter;
   subtracting said first analog signal from said second analog signal to produce a difference signal;
   summing said first and second analog signals to produce a transducer output signal;
   converting said difference signal to a digital difference signal indicative of a condition of said first and second transducers by utilizing a first analog-to-digital converter (ADC) to convert said difference signal to said digital difference signal, said ADC being characterized by a first resolution;
   converting said transducer output signal to a digital transducer output signal by utilizing a second ADC to convert said transducer output signal to said digital transducer output signal, said second ADC being characterized by a second resolution, said second resolution being greater than said first resolution;
   comparing said digital difference signal against a threshold value to determine whether said condition of said first and second transducers is one of a normal condition and a fault condition; and
   concurrently providing said digital transducer output and a logical output signal responsive to said digital difference signal to a downstream component of said device, said logical output signal informing said downstream component of said condition of said first and second transducers.

8. A device comprising:
   a sensor system having fault detection capability, said sensor system including:
   a first transducer producing a first analog signal;
   a second transducer producing a second analog signal, said first and second analog signals representing a parameter being independently sensed by both of said first and second transducers;
   a subtraction circuit in communication with each of said first and second transducers for determining a difference between said first and second analog signals to produce a difference signal;
   a summing circuit in communication with each of said first and second transducers for adding said first analog signal and said second analog signal to produce an analog transducer signal;
   a first analog-to-digital converter (ADC) in communication with said subtraction circuit for generating a digital difference signal indicative of a condition of said first and second transducers from said analog difference signal, said first ADC being characterized by a first resolution; and
   a second ADC in communication with said summing circuit for generating a digital transducer output signal from said analog transducer signal, said second ADC being characterized by a second resolution, said second resolution being greater than said first resolution; and a downstream component in communication with said sensor system for receiving said digital transducer output signal and a signal indicative of said digital difference signal.

9. A device as claimed in claim 8 further comprising a processor in communication with said ADC, said processor comparing said digital difference signal against a threshold value to determine whether said condition of said first and second transducers is one of a normal condition and a fault condition.

10. A device as claimed in claim 9 wherein said processor outputs a first logical output signal in response to determination of said normal condition and said processor outputs a second logical output signal in response to determination of said fault condition, said signal received by said downstream component being one of said first and second logical output signals.

11. A device as claimed in claim 8 wherein said sensor system further comprises an output interposed between said first and second ADCs and said downstream component for concurrent provision of said transducer output signal with said signal indicative of said digital difference signal.

12. A device as claimed in claim 8 wherein said first and second transducers are microelectromechanical sensors.

* * * * *